(12) United States Patent
Chutorash et al.

(10) Patent No.: US 9,324,230 B2
(45) Date of Patent: Apr. 26, 2016

(54) SYSTEM AND METHOD FOR CONFIGURING A WIRELESS CONTROL SYSTEM OF A VEHICLE USING INDUCTION FIELD COMMUNICATION

(75) Inventors: Richard J. Chutorash, Oakland Township, MI (US); Philip J. Vanderwall, Marne, MI (US); Mark Zeinstra, Holland, MI (US); James E. Trainor, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 996 days.

(21) Appl. No.: 12/328,663

(22) Filed: Dec. 4, 2008

(65) Prior Publication Data

US 2010/0144284 A1 Jun. 10, 2010

(51) Int. Cl.
*G05B 19/00* (2006.01)
*G08C 17/02* (2006.01)
*H04W 4/00* (2009.01)

(52) U.S. Cl.
CPC .............. *G08C 17/02* (2013.01); *H04W 4/008* (2013.01); *G08C 2201/20* (2013.01)

(58) Field of Classification Search
CPC .......... G07C 2009/00857; G07C 2009/00888; G07C 2009/00928; G08C 2201/20; H04W 4/008
USPC ..................... 340/5.25, 5.71, 10.1, 5.61, 5.22
See application file for complete search history.

(56) References Cited

U.S. PATENT DOCUMENTS

| 4,390,877 A | 6/1983 | Curran |
| 4,453,269 A * | 6/1984 | Skar ..................... H03B 5/1203 331/114 |
| 4,760,394 A * | 7/1988 | Takeuchi et al. ........... 340/10.42 |
| 4,792,796 A | 12/1988 | Bradshaw et al. |
| 4,825,200 A | 4/1989 | Evans et al. |

(Continued)

FOREIGN PATENT DOCUMENTS

| EP | 0 660 542 A1 | 6/1995 |
| EP | 1 052 609 A1 | 11/2000 |

(Continued)

OTHER PUBLICATIONS

International Search Report for PCT/US2004/017058, mail date Oct. 15, 2004, 3 pages.

(Continued)

*Primary Examiner* — Steven Lim
*Assistant Examiner* — Kam Ma
(74) *Attorney, Agent, or Firm* — Foley & Lardner LLP; Scott P. Ryan

(57) ABSTRACT

A system for mounting in a vehicle and for providing a control signal to a remote device based on information stored in a portable electronic device includes a radio frequency transmitter for transmitting a control signal to the remote device. The system also includes a first circuit configured to receive first information from the portable electronic device via inductive-coupling between the portable electronic device and the first circuit when the portable electronic device is brought within the induction field of the first circuit. The system also includes a second circuit configured to use the first information received from the portable electronic device and to at least one of format the control signal in accordance with the first information and to cause the radio frequency transmitter to format the control signal in accordance with the first information.

10 Claims, 7 Drawing Sheets

(56) References Cited

U.S. PATENT DOCUMENTS

| | | | |
|---|---|---|---|
| 4,827,520 A | 5/1989 | Zeinstra | |
| 5,113,182 A | 5/1992 | Suman et al. | |
| 5,278,547 A | 1/1994 | Suman et al. | |
| 5,475,366 A | 12/1995 | Van Lente et al. | |
| 5,479,155 A | 12/1995 | Zeinstra et al. | |
| 5,479,157 A | 12/1995 | Suman et al. | |
| 5,583,485 A | 12/1996 | Van Lente et al. | |
| 5,614,885 A | 3/1997 | Van Lente et al. | |
| 5,614,891 A | 3/1997 | Zeinstra et al. | |
| 5,619,190 A | 4/1997 | Duckworth et al. | |
| 5,627,529 A * | 5/1997 | Duckworth et al. | 340/12.24 |
| 5,630,216 A * | 5/1997 | McEwan | H03D 11/04 329/323 |
| 5,646,701 A | 7/1997 | Duckworth et al. | |
| 5,661,455 A | 8/1997 | Van Lente et al. | |
| 5,691,848 A | 11/1997 | Van Lente et al. | |
| 5,699,044 A | 12/1997 | Van Lente et al. | |
| 5,708,415 A | 1/1998 | Van Lente et al. | |
| 5,717,387 A | 2/1998 | Suman et al. | |
| 5,854,593 A | 12/1998 | Dykema et al. | |
| 5,903,226 A | 5/1999 | Suman et al. | |
| 5,907,796 A | 5/1999 | Matchett et al. | |
| 5,926,087 A | 7/1999 | Busch et al. | |
| 6,010,403 A | 1/2000 | Adam et al. | |
| 6,020,654 A | 2/2000 | Chutorash | |
| 6,020,827 A * | 2/2000 | Konrad | B60R 25/24 340/10.1 |
| 6,028,537 A | 2/2000 | Suman et al. | |
| 6,067,681 A | 5/2000 | Zeinstra et al. | |
| 6,137,421 A * | 10/2000 | Dykema | G07C 9/00857 340/12.28 |
| 6,144,114 A | 11/2000 | Chutorash | |
| 6,154,148 A | 11/2000 | Fluharty et al. | |
| 6,181,255 B1 | 1/2001 | Crimmins et al. | |
| 6,188,889 B1 | 2/2001 | Tsai | |
| 6,212,474 B1 | 4/2001 | Fowler et al. | |
| 6,282,152 B1 | 8/2001 | Kurple | |
| 6,282,407 B1 | 8/2001 | Vega et al. | |
| 6,336,031 B1 | 1/2002 | Schyndel | |
| 6,374,182 B2 | 4/2002 | Bechtolsheim et al. | |
| 6,377,173 B1 * | 4/2002 | Desai | B60R 25/24 340/10.1 |
| 6,430,164 B1 | 8/2002 | Jones et al. | |
| 6,472,771 B1 | 10/2002 | Frese et al. | |
| 6,486,795 B1 * | 11/2002 | Sobel | G08C 17/02 340/12.28 |
| 6,539,358 B1 | 3/2003 | Coon et al. | |
| 6,556,813 B2 | 4/2003 | Tsui | |
| 6,584,319 B1 | 6/2003 | Girod | |
| 6,603,405 B2 | 8/2003 | Smith | |
| 6,615,023 B1 | 9/2003 | Ehrensvard | |
| 6,771,749 B1 | 8/2004 | Bansal et al. | |
| 6,825,751 B1 * | 11/2004 | Kita et al. | 340/5.61 |
| 6,978,126 B1 | 12/2005 | Blaker et al. | |
| 7,039,397 B2 * | 5/2006 | Chuey | G08C 17/02 340/5.23 |
| 7,050,593 B1 | 5/2006 | Emerling et al. | |
| 7,050,834 B2 | 5/2006 | Harwood et al. | |
| 7,110,537 B2 | 9/2006 | Mazzara, Jr. | |
| 7,116,229 B1 * | 10/2006 | Miramontes | 340/12.28 |
| 7,228,211 B1 | 6/2007 | Lowrey et al. | |
| 7,254,182 B2 * | 8/2007 | Tsui | H04L 5/1453 340/12.52 |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 7,516,072 B2 | 4/2009 | Campbell et al. | |
| 7,564,377 B2 | 7/2009 | Kimchi et al. | |
| 7,689,253 B2 | 3/2010 | Basir | |
| 7,737,820 B2 * | 6/2010 | Flick | B60R 25/04 340/5.22 |
| 7,787,907 B2 | 8/2010 | Zeinstra et al. | |
| 7,911,358 B2 * | 3/2011 | Bos | G08C 17/02 340/12.23 |
| 8,103,445 B2 | 1/2012 | Smith et al. | |
| 8,760,267 B2 * | 6/2014 | Bos | G08C 17/02 340/12.5 |
| 8,841,988 B2 * | 9/2014 | Summerford | G07C 9/00182 340/5.64 |
| 9,143,009 B2 * | 9/2015 | Fitzgibbon | H02J 17/00 |
| 2001/0033225 A1 | 10/2001 | Razavi et al. | |
| 2002/0032510 A1 | 3/2002 | Turnbull et al. | |
| 2002/0040271 A1 | 4/2002 | Park et al. | |
| 2002/0054159 A1 | 5/2002 | Obradovich | |
| 2002/0123325 A1 | 9/2002 | Cooper | |
| 2002/0169584 A1 | 11/2002 | Fu et al. | |
| 2003/0079035 A1 | 4/2003 | Boyd et al. | |
| 2003/0096593 A1 | 5/2003 | Naboulsi | |
| 2003/0114202 A1 | 6/2003 | Suh et al. | |
| 2003/0156097 A1 | 8/2003 | Kakihara et al. | |
| 2003/0210796 A1 | 11/2003 | McCarty et al. | |
| 2003/0236818 A1 | 12/2003 | Bruner et al. | |
| 2004/0054468 A1 | 3/2004 | Yamada et al. | |
| 2004/0104842 A1 | 6/2004 | Drury et al. | |
| 2004/0207537 A1 * | 10/2004 | Keller, Jr. | G08C 19/28 340/13.27 |
| 2005/0005298 A1 | 1/2005 | Tranchina | |
| 2005/0015197 A1 | 1/2005 | Ohtsuji et al. | |
| 2005/0024185 A1 * | 2/2005 | Chuey | G08C 17/02 340/5.71 |
| 2005/0024264 A1 | 2/2005 | Harrison | |
| 2005/0046545 A1 * | 3/2005 | Skekloff | B60R 25/24 340/5.61 |
| 2005/0053008 A1 | 3/2005 | Griesing et al. | |
| 2005/0197747 A1 | 9/2005 | Rappaport et al. | |
| 2005/0208968 A1 | 9/2005 | Codeville | |
| 2005/0239434 A1 | 10/2005 | Marlowe | |
| 2005/0242970 A1 | 11/2005 | Blaker et al. | |
| 2005/0245272 A1 | 11/2005 | Spaur et al. | |
| 2006/0038668 A1 * | 2/2006 | DeWard | B60R 11/04 340/438 |
| 2006/0129636 A1 | 6/2006 | Matsuura et al. | |
| 2006/0135064 A1 | 6/2006 | Cho et al. | |
| 2006/0158344 A1 | 7/2006 | Bambini et al. | |
| 2006/0214813 A1 | 9/2006 | Witkowski et al. | |
| 2006/0232376 A1 * | 10/2006 | Blaker | B60R 25/24 340/5.22 |
| 2006/0232377 A1 | 10/2006 | Witkowski | |
| 2007/0057810 A1 * | 3/2007 | Bos | G08C 17/02 340/12.22 |
| 2007/0123191 A1 | 5/2007 | Simpson | |
| 2007/0143798 A1 | 6/2007 | Jira | |
| 2007/0152798 A1 | 7/2007 | Witkowski | |
| 2007/0176735 A1 * | 8/2007 | Blaker | B60R 25/24 340/5.22 |
| 2007/0197172 A1 | 8/2007 | Witkowski et al. | |
| 2007/0210905 A1 | 9/2007 | Battista | |
| 2007/0213092 A1 | 9/2007 | Geelen | |
| 2007/0225898 A1 | 9/2007 | Pfleging et al. | |
| 2007/0252689 A1 | 11/2007 | Rothschild | |
| 2008/0027643 A1 | 1/2008 | Basir et al. | |
| 2008/0068205 A1 * | 3/2008 | Witkowski | B60R 25/24 340/4.3 |
| 2008/0169900 A1 * | 7/2008 | Mullet | G07C 9/00309 340/5.71 |
| 2008/0192659 A1 | 8/2008 | Santavicca | |
| 2008/0221742 A1 | 9/2008 | DiCroce | |
| 2008/0244050 A1 | 10/2008 | Wong et al. | |
| 2009/0085728 A1 | 4/2009 | Catten et al. | |
| 2010/0100310 A1 | 4/2010 | Eich et al. | |
| 2010/0244768 A1 * | 9/2010 | Ghabra | H02J 7/025 320/108 |

FOREIGN PATENT DOCUMENTS

| | | |
|---|---|---|
| EP | 1 058 220 | 12/2000 |
| EP | 1 304 695 A2 | 4/2003 |
| EP | 1 338 866 A2 | 8/2003 |
| EP | 1 357 358 A1 | 10/2003 |
| EP | 1 058 220 B1 | 2/2004 |
| EP | 1 387 145 A1 | 2/2004 |
| EP | 1 493 994 B1 | 1/2005 |
| EP | 1 560 200 | 8/2005 |
| EP | 1 568 834 A1 | 8/2005 |

(56) References Cited

FOREIGN PATENT DOCUMENTS

| | | |
|---|---|---|
| EP | 1 655 677 A2 | 5/2006 |
| EP | 1 698 518 A2 | 9/2006 |
| EP | 1 959 410 A1 | 8/2008 |
| EP | 1959410 A1 * | 8/2008 |
| EP | 1 560 200 B1 | 11/2008 |
| EP | 1 052 609 B1 | 3/2009 |
| GB | 2 375 397 | 5/2004 |
| JP | 01-290032 | 11/1989 |
| JP | 2001-297527 A | 10/2001 |
| JP | 2001-304875 A | 10/2001 |
| JP | 2002-087183 A | 3/2002 |
| JP | 2002-169584 A | 6/2002 |
| JP | 2002-171217 A | 6/2002 |
| JP | 2003-244343 A | 8/2003 |
| JP | 2003-304339 A | 10/2003 |
| JP | 2003-330856 | 11/2003 |
| JP | 2004-153660 A | 5/2004 |
| JP | 2005-236560 A | 9/2005 |
| JP | 2005-284886 A | 10/2005 |
| JP | 2006-033377 | 2/2006 |
| JP | 2006-321470 A | 11/2006 |
| JP | 2007-256137 | 10/2007 |
| WO | WO 00/75905 A1 | 12/2000 |
| WO | WO-01/67413 | 9/2001 |
| WO | WO 2004/043750 A2 | 5/2004 |
| WO | WO 2004/077729 A2 | 9/2004 |
| WO | WO 2005/002080 A1 | 1/2005 |
| WO | WO-2006/063602 A1 | 6/2006 |
| WO | WO-2007/123798 A1 | 11/2007 |
| WO | WO 2008/079811 A1 | 7/2008 |
| WO | WO-2008/079889 A2 | 7/2008 |
| WO | WO-2008/079891 A2 | 7/2008 |
| WO | WO-2008/091727 A1 | 7/2008 |
| WO | WO-2009/073806 A2 | 6/2009 |

OTHER PUBLICATIONS

Office Action for U.S. Appl. No. 10/558,121, mail date Jan. 20, 2010, 8 pages.
Written Opinion for PCT/US2004/017058, mail date Oct. 15, 2004, 7 pages.
Office Action for U.S. Appl. No. 10/558,121, mail date Jul. 9, 2010, 11 pages.
http://en.wikipedia.org/wiki/Near_Field_Communication, believed to be available by at least Dec. 3, 2008, 11 pages.
International Search Report and Written Opinion for International Patent Application No. PCT/US2009/065855, dated Jun. 11, 2010, 15 pages.
Office Action for U.S. Appl. No. 13/428,857, mail date Jul. 30, 2013, 27 pages.
Dahn, et al., "Combinatorial Study of Sn1—xCox ($0 < x < 0.6$) and [Sn0.55Co0.45]1-yCy ($0 < y < 0.5$) Alloy Negative Electrode Materials for Li-Ion Batteries," Journal of Electrochemical Society, (2006), 153:A361-365.
European Office Action dated Jun. 25, 2010 as received in corresponding European Application No. 07869539.2.
International Search Report and Written Opinion for International Application No. PCT/US2007/088171, mailing date Jun. 27, 2008.
International Search Report and Written Opinion for International Application No. PCT/US2007/088175, mail date Sep. 19, 2008, 10 pages.
International Search Report and Written Opinion for International Patent Application No. PCT/US2008/085570, mailed Oct. 22, 2009.
International Search Report and Written Opinion for International Patent Appln. No. PCT/US2008/050436 dated Jun. 18, 2008, 9 pages.
Invitation to Pay Additional Fees and Communication Relating to the Results of the Partial International Search dated Jun. 12, 2009 as received in PCT/US2008/085570, 6 pages.
Japan Office Action dated May 15, 2012 as received in corresponding Japan Application No. 2009-543188 and its English Translation, 7 pages.
Japan Office Action dated May 15, 2012 as received in corresponding Japan Application No. 2009-547339 and its English Translation.
mp3car.com, MP3Car.com Wiki, http://www.mp3car.com, believed to be available by at least Jan. 12, 2007, 11 pages.
Office Action for European Patent Application No. 07869543.4, dated Dec. 22, 2010, 6 pages.
Office Action for European Patent Application No. 07869543.4, dated Oct. 14, 2009, 3 pages.
Office Action in EP Appln No. 08705741; dated Jan. 13, 2010, 3 pages.
Office Action in JP 2010-537078 dated Oct. 2, 2012.
Office Action in JP Appln No. 2009-543188 dated Nov. 6, 2012.
Office Action in U.S. Appl. No. 13/428,857 dated Oct. 16, 2012.
Office Action in U.S. Appl. No. 12/519,735 dated Jun. 13, 2012.
Office Action in U.S. Appl. No. 13/007,447 dated Aug. 27, 2012.
Office Action U.S. Appl. No. 10/558,121 dated Apr. 11, 2012.
PCT Invitation to Pay Additional Fees and Partial International Search Report as received in PCT/US2009/065855, dated Mar. 19, 2010.
US Office Action on U.S. Appl. No. 12/519,735 Dtd Jan. 10, 2013.
US Office Action on U.S. Appl. No. 12/780,779 Dtd Mar. 1, 2013.
US Office Action on U.S. Appl. No. 13/428,857 Dtd Mar. 15, 2013.
Non-Final Office Action mailed Sep. 11, 2013, as received in co-pending U.S. Appl. No. 12/519,735.
Notice of Allowance mailed Oct. 8, 2013, as received in co-pending U.S. Appl. No. 12/780,779.
Examination Report in corresponding European Application No. 08 857 882.8 dated Feb. 26, 2015, 4 pages.
Office Action for Japanese Patent Application No. 2009-543188 dated Jun. 3, 2014, along with English translation, 7 pages.
Office Action dated Nov. 19, 2015, in corresponding European application No. 09 764 660.8, 4 pages.

* cited by examiner

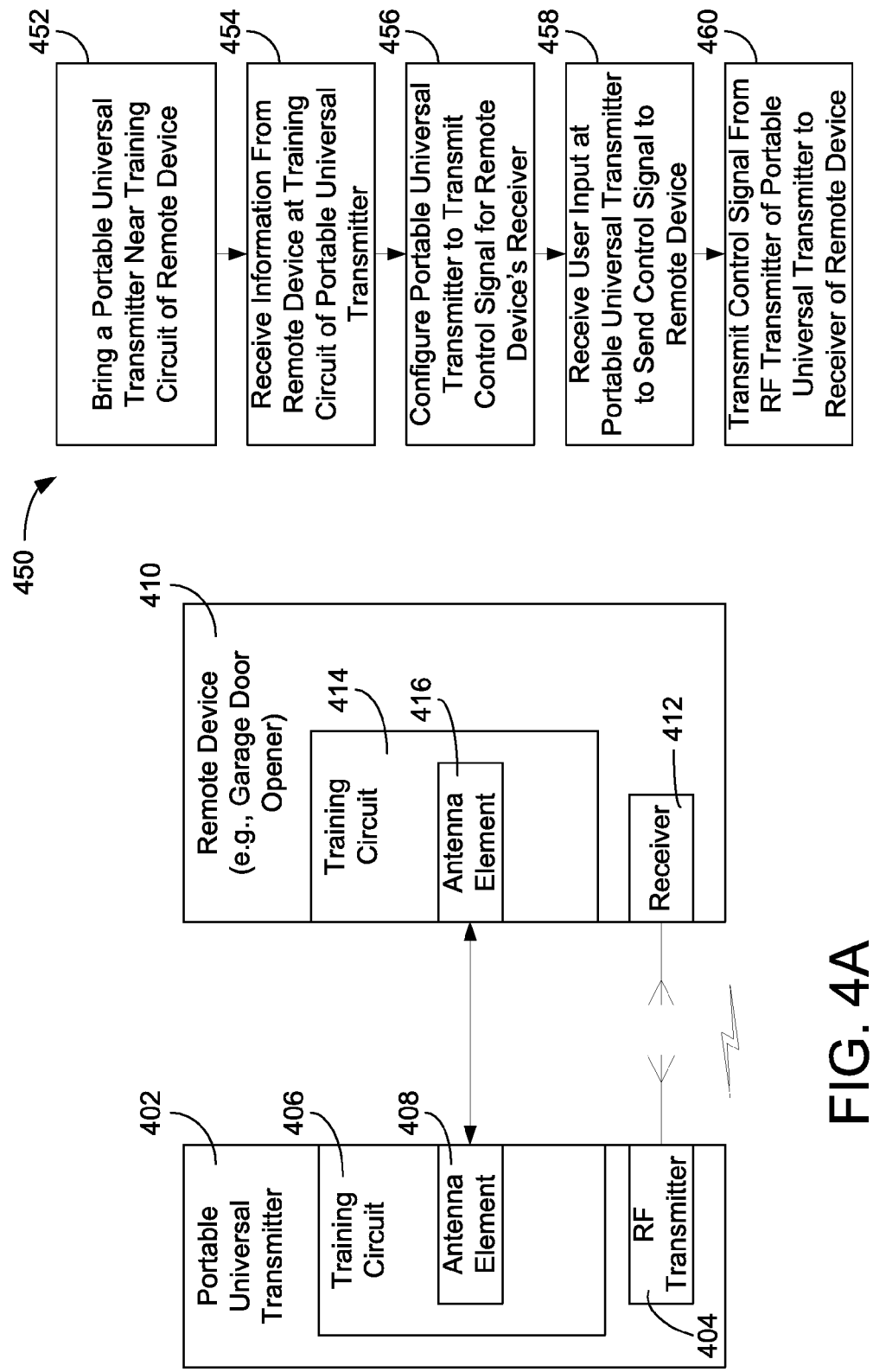

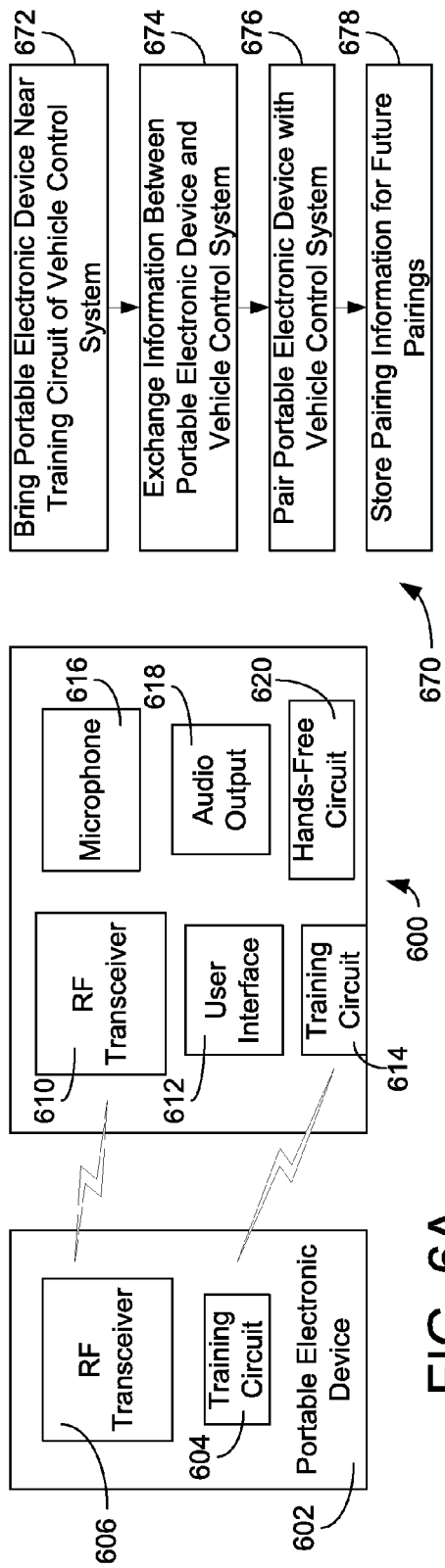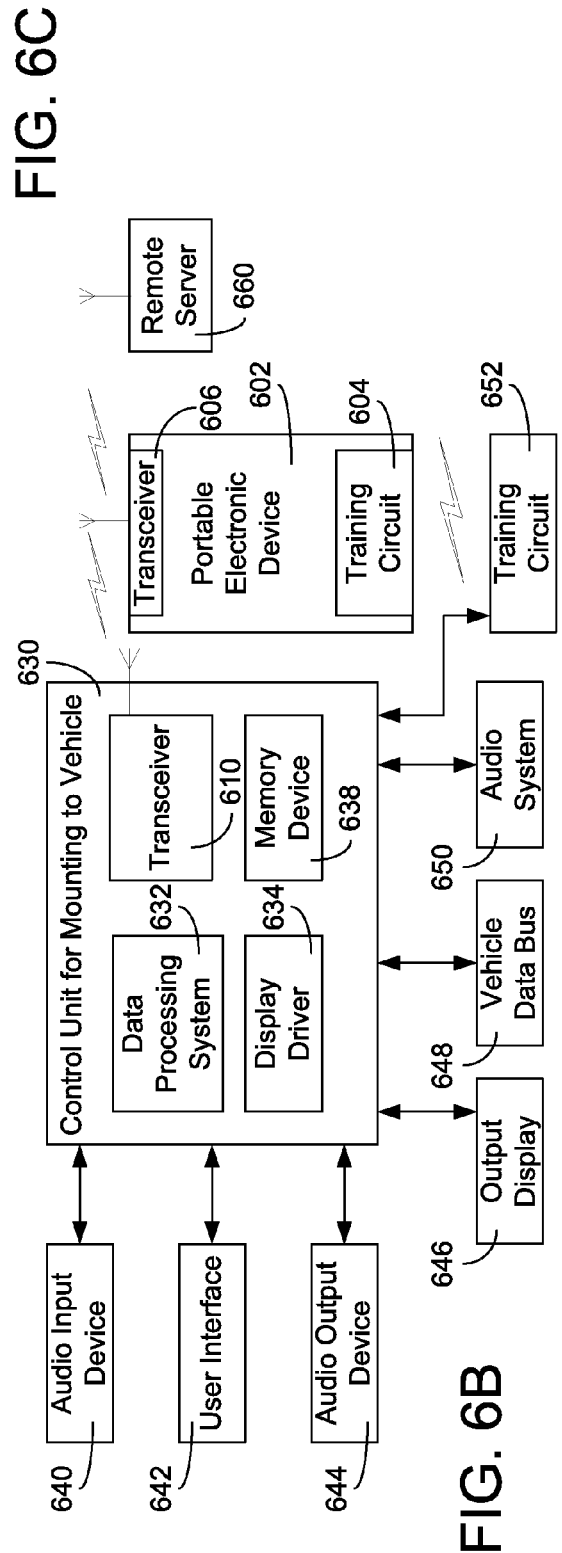

SYSTEM AND METHOD FOR CONFIGURING A WIRELESS CONTROL SYSTEM OF A VEHICLE USING INDUCTION FIELD COMMUNICATION

BACKGROUND

The present disclosure generally relates to systems and methods for configuring a wireless control system of a vehicle.

Wireless control systems are provided in vehicles for activities such as actuating a remote device (e.g., a garage door opener), establishing a data communication link with a remote system, establishing a voice communication link with a portable electronic device, and for other purposes.

Vehicle-based wireless control systems are sometimes difficult to configure for use with particular remote devices, systems, and/or portable electronic devices.

Improved systems and methods for configuring a wireless control system of a vehicle are needed.

SUMMARY

One embodiment relates to a system for mounting in a vehicle and for providing a control signal to a remote device based on information stored in a portable electronic device. The system includes a radio frequency transmitter for transmitting a control signal to the remote device. The system also includes a first circuit configured to receive first information from the portable electronic device via inductive-coupling between the portable electronic device and the first circuit when the portable electronic device is brought within the induction field of the first circuit. The system also includes a second circuit configured to use the first information received from the portable electronic device and to at least one of format the control signal in accordance with the first information and to cause the radio frequency transmitter to format the control signal in accordance with the first information.

Another embodiment relates to a method for providing a control signal from a radio frequency transmitter coupled to a vehicle to a remote device based on information stored in a portable electronic device. The method includes receiving first information from the portable electronic device via inductive-coupling between the portable electronic device and a first circuit when the portable electronic device is brought within the induction field of the first circuit. The method further includes using a second circuit to process the first information received from the portable electronic device to at least one of format the control signal in accordance with the first information and to cause the radio frequency transmitter to format the control signal in accordance with the first information. The method further includes transmitting the control signal to the remote device.

Another embodiment relates to a system for facilitating hands-free communication in a vehicle using a portable electronic device. The system includes a first circuit configured to receive first information from the portable electronic device via inductive-coupling between the portable electronic device and a first circuit when the portable electronic device is brought within the induction field of the first circuit. The system further includes a hands-free communication module configured to control an RF transceiver and to use the first information received at the first circuit to connect the RF transceiver to the portable electronic device. The system yet further includes electronics configured to restrict the use of other portable electronic devices in the vehicle.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 4A is a block diagram of a portable universal transmitter and remote device in communication with each other, according to an exemplary embodiment;

FIG. 4B is a flow chart of a process of communications between the components of FIG. 4A, according to an exemplary embodiment;

FIG. 6A is a block diagram of a portable electronic device and vehicle control system, according to an exemplary embodiment;

FIG. 6B is a detailed block diagram of a vehicle control unit, according to an exemplary embodiment;

FIG. 6C is a flow chart of a pairing process between a vehicle control system and portable electronic device, according to an exemplary embodiment;

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for configuring a wireless control system of a vehicle using magnetic field induction are shown. Particularly, the figures and accompanying text variously describe systems and methods for training the wireless control system of the vehicle using a portable electronic device, where the portable electronic device communicates the information to train the vehicle's wireless control system via magnetic field induction (e.g., "near field communication"). According to various exemplary embodiments, such a system may include a first circuit (e.g., a near field communication circuit) configured to receive the information from the portable electronic device via magnetic field induction. A second circuit coupled to the first circuit may be configured to use the information to configure (e.g., "train") the wireless control system to transmit an appropriate control signal to a target remote device via an RF transceiver. For example, the second circuit may be configured to use the information received from the portable electronic device at the first circuit to format the control signal for transmission to the remote device or to cause the transmitter to format the control signal for transmission to the remote device.

Figure 1:
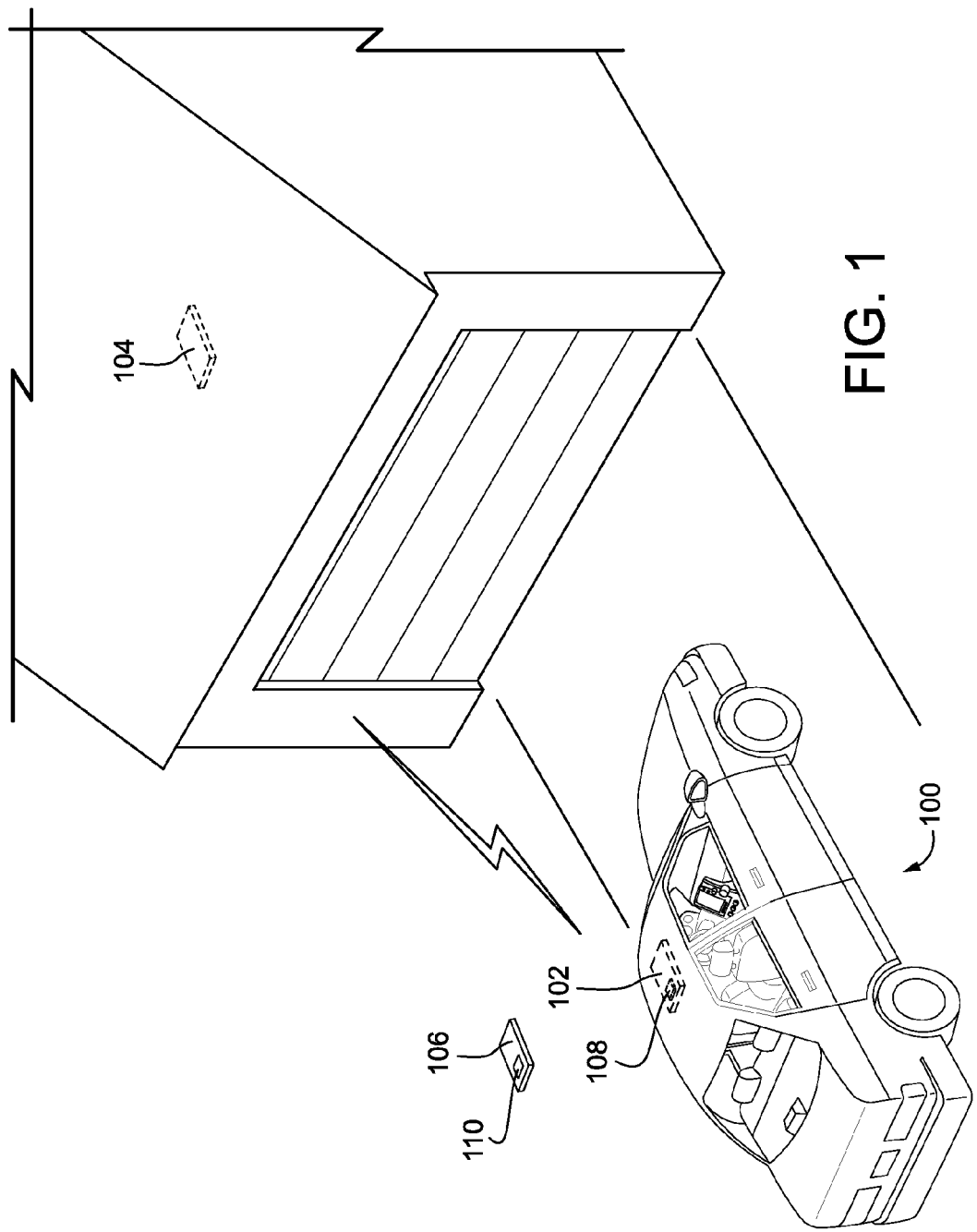
FIG. 1 is a perspective view of a vehicle having a control system configured to provide a control signal to a remote device, according to an exemplary embodiment.

Training a Vehicle Control System for Communication with the Remote Device Using Information Received Via Induction Field Communication Referring now to FIG. 1, a perspective view of a vehicle 100 having a control system 102 configured to provide a control signal to a remote device 104 is shown, according to an exemplary embodiment. According to the embodiment shown FIG. 1, remote device 104 is a garage door opener for opening a garage door such as the garage door illustrated in FIG. 1. Remote device 104 includes or is associated with a receiver that receives the control signal and causes the garage door opener to open the garage door based on the received control signal. A receiver included or associated with remote device 104 such as a garage door opener is typically configured to cause remote device 104 to actuate or change states only if the control signal is determined to be from an authorized device. The receiver typically determines whether or not the control signal is from an authorized device based on characteristics of the control signal. For example, a receiver included or associated with remote device 104 may be configured to cause remote device 104 to actuate or change state if the control signal is sent at a certain frequency or frequencies, includes representations of particular codes, is formatted in a particular way, includes a certain cryptography key, is modulated a certain way, and the like.

A receiver included or associated with a remote device such as remote device 104 is typically associated with one or more portable transmitters such as portable transmitter 106 configured to provide an appropriately formatted control signal to the receiver. Portable transmitter 106 may be an original transmitter sold with remote device 104 and/or previously configured for communications with the receiver of remote device 104. Control system 102 mounted in vehicle 100 may not generally be pre-configured for communications with remote device 104 when first sold to a user (with the vehicle or otherwise). Control system 102 can be configured for wireless communications with remote device 104 via a one or more configuration processes (e.g., training processes, setup processes, etc.). For example, control system 102 can include a radio frequency receiver configured to receive radio frequency control signals from portable transmitter 106 and to configure itself using the received radio frequency control signals.

According to an exemplary embodiment, control system 102 includes a circuit 108 configured to receive information from portable transmitter 106 via magnetic field induction between circuit 108 and a circuit 110 of portable transmitter 106. Using the information received from portable transmitter 106 via the magnetic field induction, control system 102 configures itself for transmitting a control signal formatted for authorized reception by remote device 104. According to various exemplary embodiments, circuit 108 is configured to receive the information from portable transmitter 106 according to a near field communication (NFC) specification, an RFID specification, a contactless card specification (e.g., ISO 14443), or any other communications specification providing the short-range exchange of data via magnetic field induction.

Figure 2:
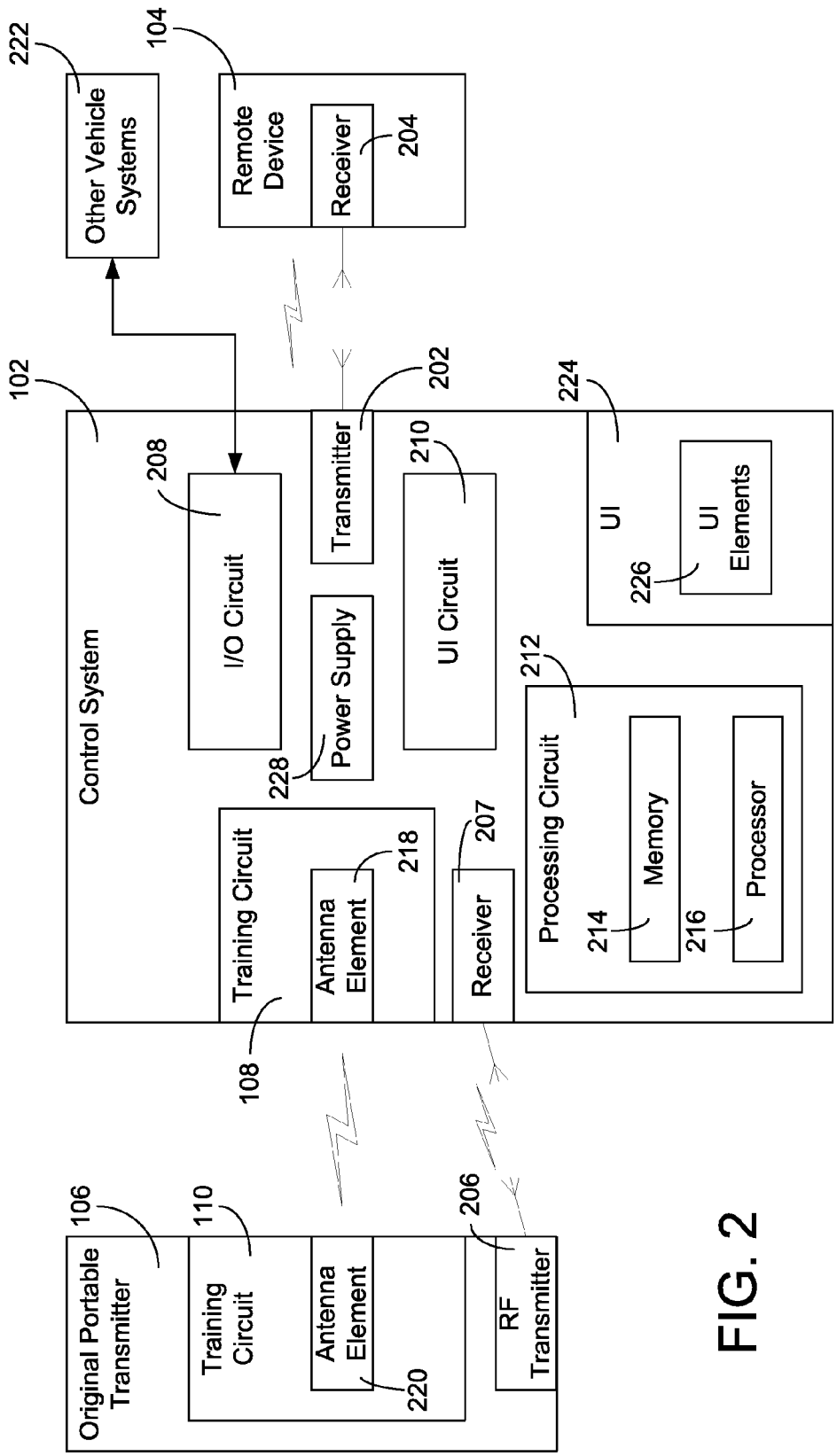
FIG. 2 is a block diagram of a control system, according to an exemplary embodiment.

Referring now to FIG. 2, a block diagram of control system 102 is shown, according to an exemplary embodiment. Control system 102 is shown to include circuit 108 (i.e., training circuit), radio frequency (RF) transmitter 202, I/O Circuit 208, UI Circuit 210, and processing circuit 212. According to an exemplary embodiment, control system 102 is configured to be mounted to a vehicle such as vehicle 100 (e.g., mounted in a vehicle interior location, a center stack location, a dashboard location, a center console location, an overhead console, a floor console location, an instrument panel location, a door panel location, a visor location, a rear-view mirror, a headliner location, etc.).

According to an exemplary embodiment, during normal operation, control system 102 is commanded to transmit a control signal to remote device 104 based on user input signals received from user interface (UI) 224 at UI circuit 210. When one of the plurality of user interface elements 226 (e.g., buttons, switches, touch-sensitive elements, voice recognition systems, touch screens, etc.) are pressed or otherwise used, UI circuit 210 and processing circuit 212 cause RF transmitter 202 to transmit a control signal associated with the pressed or activated user interface element 226. Processing circuit 212 may be configured to format the control signal or to cause transmitter 202 to format the control signal in a way that is expected to result in a successful reception by receiver 204 of remote device 104. The transmission of the control signal can also be triggered based on input received from other vehicle systems 222 via I/O circuit 208. Other vehicle systems 222 may include, for example, a positioning device (e.g., GPS receiver) and processing circuit 212 may be configured to cause RF transmitter 202 to transmit the control signal based on position information received at I/O circuit 208. Other vehicle systems 222 may also include vehicle communications systems (e.g., configured to receive data from a mobile phone, an Internet source, or otherwise), vehicle center stack control systems, voice recognition systems, body electronics modules configured to receive signals from key fobs or other remote controls, and the like that may be configured to provide signals that control or otherwise affect the behavior of control system 102.

Original portable transmitter 106 is shown to include RF transmitter 206 and training circuit 110, according to an exemplary embodiment. RF transmitter 206 and other circuitry (e.g., a user interface element, processing circuit, memory, etc.) of original portable transmitter 106 are configured to transmit a control signal configured for successful reception by RF receiver 204 of remote device 104. In one embodiment, control system 102 may include an RF receiver 207 configured to receive a control signal transmitted by RF transmitter 206. Based on the received control signal, control system 102 may configure itself to transmit appropriate control signals to remote device 104 via RF transmitter 202. The control circuitry for learning an RF control signal from the original portable transmitter and for transmitting the learned control signal, on command, to remote device 104 may be as generally sold by Johnson Controls, Inc. in the HomeLink® product line.

According to an exemplary embodiment, control system 102 may also configure itself for operation with remote device 104 using communications exchanged between training circuit 110 of original portable transmitter 106 at training circuit 108 of control system 102. Training circuit 108 is configured to receive the communications from training circuit 110 via magnetic field induction. According to an exemplary embodiment, another near field communication technique may be utilized for communications between training circuit 110 and training circuit 108. Each of training circuits 108 and 110 are shown to include an antenna (antennas 218 and 220, respectively). Antennas 218 and 220 may be loop antennas configured to form an air-core transformer when located within each other's near field (e.g., "induction field", "near zone", within a small number of wavelengths, etc.). Training circuit 110 may generally be configured to generate current flow in antenna element 220 to induce current flow in antenna 218 in a way that can be recognized by training circuit 108 for the purpose of communicating data from training circuit 110 to training circuit 108. In other words, the training circuits and their respective antennas are configured to communicate via inductive-coupling, the training circuits using the inductive-coupling to communicate over a small distance (e.g., 1-4 centimeters, less than 4 centimeters, less than 10 centimeters, etc.).

According to an exemplary embodiment, training circuit 110 may be configured to generate electromagnetic radiation within the radio frequency ISM band of 13.56 MHz and having a bandwidth of around 2 MHz. According to various other exemplary embodiments, training circuit 110 may be configured to generate electromagnetic radiation within or around different frequency bands and/or having different bandwidths. According to some exemplary embodiments, training circuit 108 is configured as an RFID reader according to one or more standard or proprietary RFID specifications. According to various embodiments, by contrast, RF transmitter 202 and RF transmitter 206 are configured for far field RF communications (e.g., radiation field communications, in the band of 288-433 MHz, around 150-600 MHz, around 900 MHz, around 2.4 GHz, etc.).

When information is received by training circuit 108 via the induction field communication, processing circuit 212 may be configured to use the information to format a control signal to be sent to remote device 104 and/or to cause RF transmitter 202 to format the control signal in accordance with the first information. In other words, the information received via the near field inductive-coupling of the portable electronic device and the training circuit of the vehicle control system can be used to "train" the control system for effective communications with a remote device such as a garage door opener.

Processing circuit 212 may also be configured to initiate and/or control the actual transmission of the control signal. When information is received by training circuit 108, processing circuit 212 may be configured to store the received information in memory, to process the received information and/or to set variables stored in memory 214. In some exemplary embodiments, the information received by training circuit 108 may include a code to be transmitted by RF transmitter 202. In other exemplary embodiments, the information received by training circuit 108 may include one or more bits of data or other parts of information that may be recognized and used by processing circuit 212 to set variables stored in memory 214. For example, memory 214 may store a manufacturer identifier from which a code is generated; the code included with or in a control signal for transmission to remote device 104. In such an embodiment, and in various other embodiments, the information received at training circuit 108 may be or represent a manufacturer identifier. Processing circuit 212 can store the manufacturer identifier in memory 214 for later use by control system 102 (e.g., to format the control signal transmitted by RF transmitter 202 and/or to cause the radio frequency transmitter to format the control signal, etc.). According to various exemplary embodiments, the information transmitted to and received by training circuit 108 can be or include one or more of a fixed code, a portion of a variable code, a manufacturer identifier, a frequency, a crypt key, a rolling code count, synchronization information, a modulation scheme identifier, and any other data that may be used by control system 102 to provide a control signal expected to be recognized and/or authorized by remote device 104. Processing circuit 211 may further include a processor 216 for executing the tasks described herein (e.g., by executing computer code stored in memory) and for facilitating the activities of control system 102.

Figures 3A, 3B:
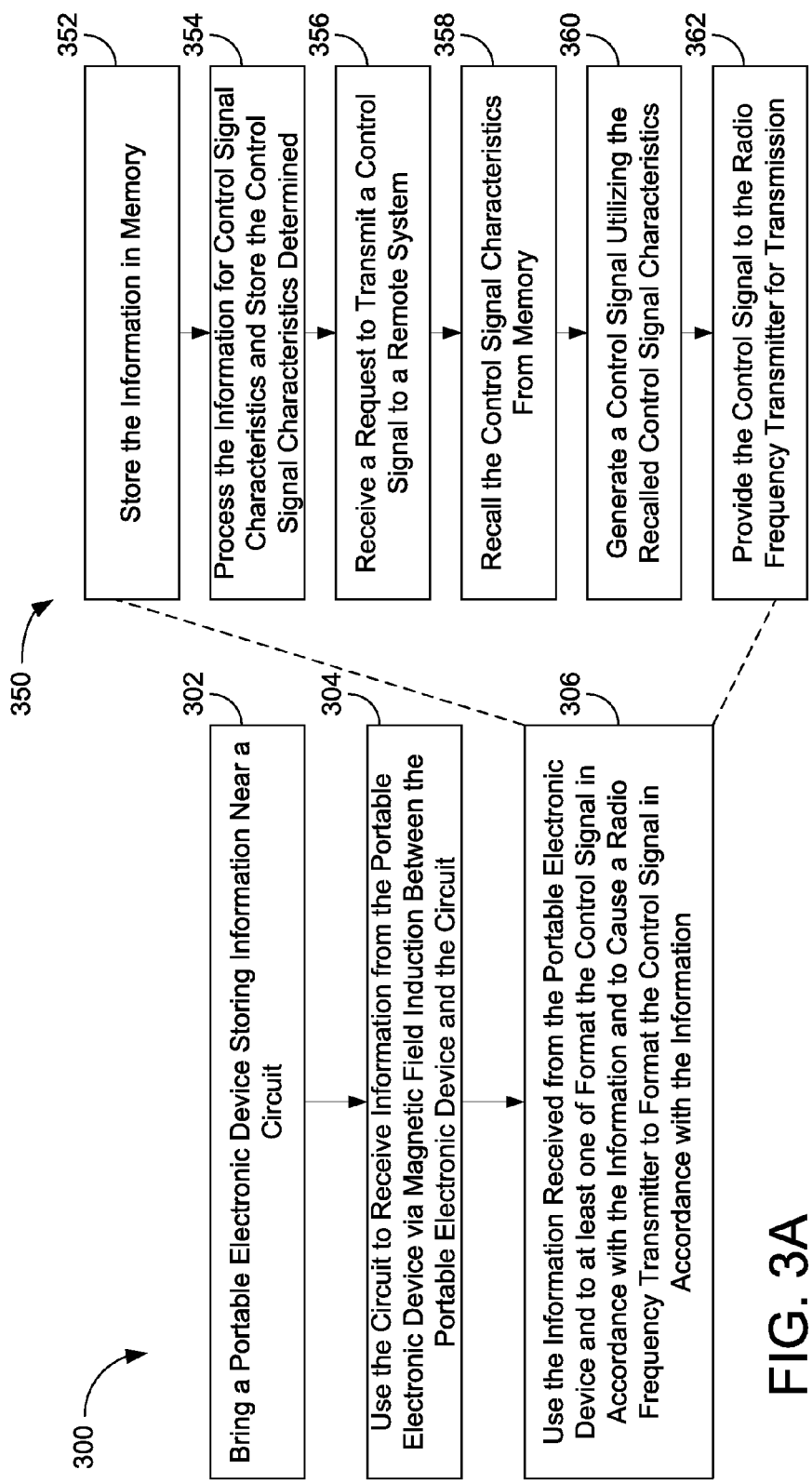
FIG. 3A is a flow chart of a process of receiving and using information from a portable electronic device, according to an exemplary embodiment.
FIG. 3B is a flow chart of a process of using information received from a portable electronic device, according to an exemplary embodiment.

Referring to FIG. 3A, a flow chart of a process 300 for using a vehicle control system (e.g., control system 102 of FIG. 2) to learn information from a portable electronic device (e.g., original portable transmitter 106 of FIG. 2) via induction field communication and for generating a control signal for transmission to a remote device is shown, according to an exemplary embodiment. A portable electronic device may be brought near (e.g., within five centimeters) a training circuit of the control system (step 302). The portable electronic device includes information (e.g., information regarding a control signal for a garage door opener) that may be transmitted to the circuit. The training circuit and/or the portable electronic device may be configured to automatically communicate when the portable electronic device is brought near the training circuit. Information from the portable electronic device may be received by using the training circuit (step 304) and via induction field communications. The information may be used by the control system to configure the control system for effective transmission to a remote device. For example, the information may be used to format a control signal in accordance with the information and/or to cause a RF transmitter to format the control signal in accordance with the information (step 306). The information might be used to select a frequency, to generate a coded transmission based on a fixed code scheme, to generate a coded transmission based on a rolling code scheme, or to otherwise format the code based on the information.

Referring now to FIG. 3B in addition to FIG. 3A, step 306 of process 300 is described in greater detail. The control system may be configured to store the information received in step 304 in memory (step 352)(e.g., memory device 214 shown in FIG. 2). Prior to, during, and/or after storage in memory, the information may be processed to determine control signal characteristics (step 354) and the determined control signal characteristics may be stored in memory. The control system may then (e.g., later—when the vehicle is driven near a remote system) receive a request (e.g., via a button press, via a voice command, etc.) to transmit a control signal to the remote system (step 356). The control signal characteristics may then be recalled from memory (step 358) and a control signal utilizing the recalled control signal characteristics may be generated (step 360). The generated control signal may be provided to an RF transmitter for transmission (step 362) and transmitted to the remote system. A training process between the vehicle control system and the remote system may need to be completed, by, for example, pressing a button on the remote system, transmitting the control signal a number of times, releasing the transmit button when the remote system is seen to actuate, via bi-directional communication with the remote system, etc. However, according to various exemplary embodiments, at least part of the process of training the control system to the remote system is completed via the transmission of the information from the portable electronic device to the control system via inductive-coupling.

In FIG. 4A, a system for training a portable universal transmitter 402 to a remote device 410 such as a garage door opener is shown, according to an exemplary embodiment. Portable universal transmitter 402 includes a training circuit 406 and remote device 410 includes a training circuit 414. Training circuits 406, 414 may be configured as described in FIG. 2 (e.g., circuits 406, 414 are configured to utilize antenna elements 408, 416 for induction field communications). Accordingly, portable universal transmitter 402 receives information for configuring itself from remote device 410 via training circuit 406. The configuration activity may be as described above or otherwise (e.g., a processing circuit may determine control signal characteristics and/or store the control signal characteristics in a memory device based on the received information). Based on the configuration activity, the control signal characteristics, and/or the information, portable universal transmitter 402 provides an appropriately formatted control signal to remote device 410, and the remote device's receiver 412, from RF transmitter 404.

Referring now to FIG. 4B, and continuing to refer to FIG. 4A, a flow chart of a process 450 for training portable universal transmitter 402 based on information received from remote device 410 is shown, according to an exemplary embodiment. Process 450 is shown to include bringing portable universal transmitter 402 near remote device 410's training circuit 414 (which may be located apart from the rest of remote device 410) (step 452). Process 450 is further shown to include receiving information at training circuit 406 from training circuit 414 using antenna elements 408, 416 (step 454). The information received by portable universal transmitter 402 may be as described above or otherwise includes data for allowing a receiving device to train to remote device 410. Process 450 further includes the step of using circuitry of portable universal transmitter 402 to configure itself to transmit a control signal to the remote device 410's receiver via RF transmitter 404 (step 456). When user input is received at portable universal transmitter 402 (e.g., via a button press)(step 458), portable universal transmitter 402 transmits a control signal from RF transmitter 404 to receiver 412 of remote device 410 (step 460), the control signal based on the information received at portable transmitter 402's training circuit 406.

Figure 5B:
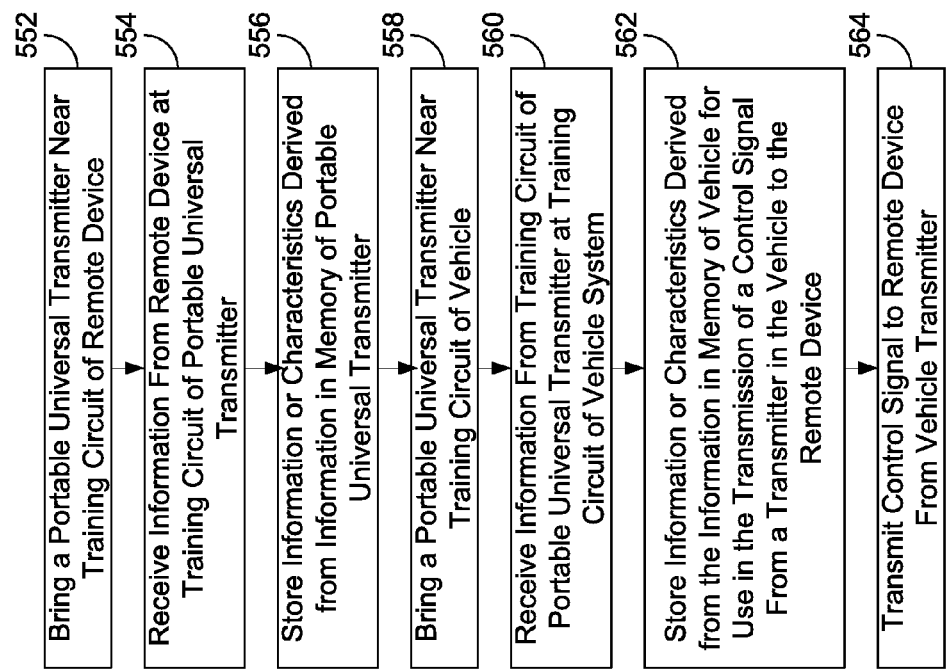
FIG. 5B is a flow chart of a process of communications between the components of FIG. 5A, according to an exemplary embodiment.
Figure 5A:
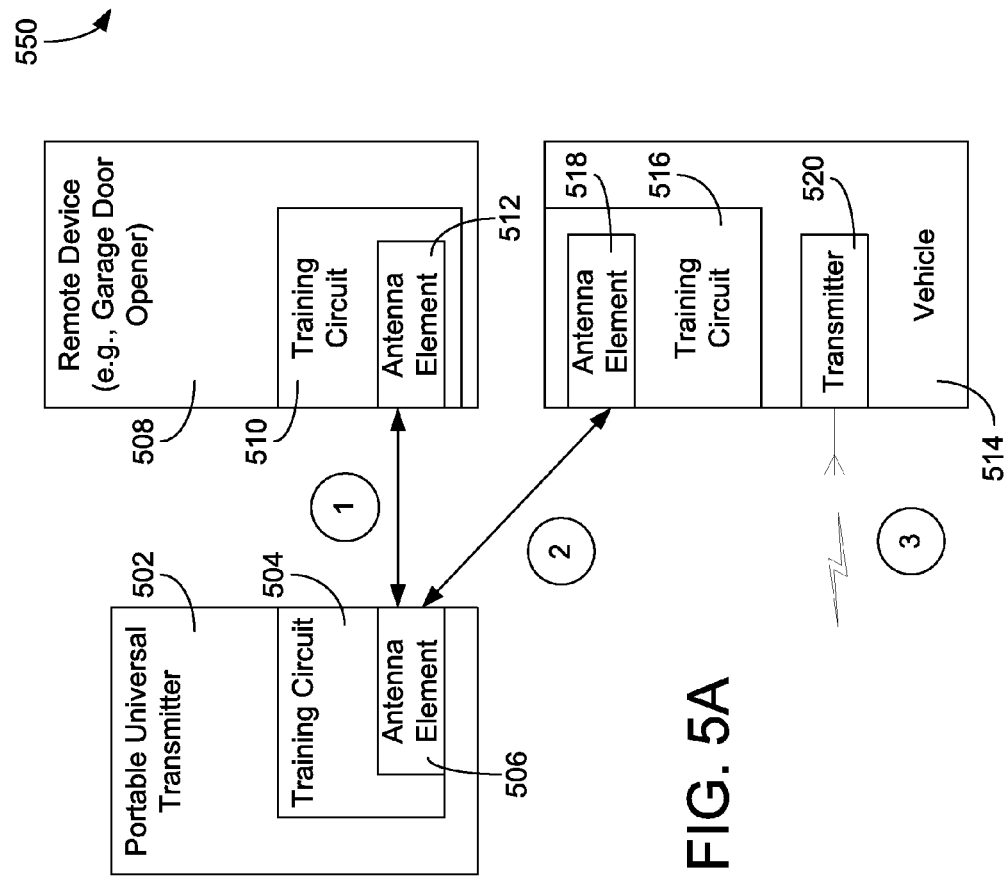
FIG. 5A is a block diagram of a portable universal transmitter, remote device, and vehicle in communication with each other, according to an exemplary embodiment.

Using a Portable Universal Transmitter to Learn Information from a Remote Device and to Train a Vehicle Control System for Communication with the Remote Device Using the Learned Information Referring to FIGS. 5A and 5B, a system and process 550 for training a vehicle transmitter 520 with a portable universal transmitter 502 for communications with a remote device 508 are shown, according to an exemplary embodiment. Portable universal transmitter 502 may be brought near training circuit 510 of remote device 508 (step 552)(e.g., a user may hold portable universal transmitter 502 up near a garage door opener). Antenna element 512 of training circuit 510 and antenna element 506 of training circuit 504 may be configured to inductively couple in each other's inductive fields in a way that training circuit 510 communicates information to training circuit 504. Training circuit 504 of portable universal transmitter 502 can receive information from remote device 508 (step 554). Portable universal transmitter 502 may determine control signal characteristics from the received information, and the information and/or the characteristics derived from the information may be stored in memory of portable universal transmitter 502 (step 556). After this step, portable universal transmitter 502 can be used for a length of time (days, weeks, years, etc.) as a handheld transmitter for actuating remote device 508. As described above, or via a different process, portable universal transmitter 502 can be used to train a control system or transmitter 520 of vehicle 514.

Referring still to FIG. 5B, portable universal transmitter 502 may be brought near training circuit 516 of vehicle 514 (step 558) to begin a training process. Training circuit 516 can receive information from transmitter 502 (step 560) via near field inductive coupling between antenna element 506 and antenna element 518. Vehicle 514 may store the information (and/or characteristics derived from the information) in memory of vehicle 514 (step 562). The information and/or characteristics derived from the information may be recalled from memory and used for a transmission of a control signal from transmitter 520 of vehicle 514 to remote device 508 (step 564).

Exchanging Pairing Information Via Induction Field Communication Between a Vehicle Control System and a Portable Electronic Device Referring generally to FIGS. 6A-C, some types of portable electronic devices are configured to pair with other devices having compatible transceivers (e.g., Bluetooth transceivers). Pairing processes typically require users to provide some authentication details such as a passkey to at least one of the portable electronic device or the device with which the portable electronic device will connect. In FIGS. 6A-C, exemplary systems and methods for facilitating the pairing process between a portable electronic device and a vehicle control system using induction field communication are shown.

In FIG. 6A, a portable electronic device 602 is shown connected to various components of a vehicle control system 600. Portable electronic device 602 includes training circuit 604 configured to communicate with a training circuit 614 of vehicle control system 600. Portable electronic device 602 further includes RF transceiver 606 for forming a wireless RF communications link with RF transceiver 610 of vehicle control system 600. According to an exemplary embodiment, vehicle control system 600 is a BlueConnect® hands-free communication system sold by Johnson Controls, Inc. According to various other exemplary embodiments, vehicle control system 600 may be a navigation system, an audio system, a vehicle computer system, or any other vehicle-mounted system which may be configured to communicate with portable electronic device 602 via transceivers 606, 610. In the embodiment shown in FIG. 6A, vehicle control system 600 includes user interface 612 which may be or include one or more buttons, touch screen areas, switches, display elements, or other elements configured to provide output to a user and/or to receive user input. Vehicle control system 600 further includes a microphone 616 for a user to provide an audio input (e.g., speech, verbal commands, verbal requests, numbers, digits, letters, etc.) and an audio output 618 (e.g., a local speaker driven by a local amplifier, an interface configured to provide audio signals to a vehicle audio system, etc.). Hands-free circuit 620 may be electronics configured to cause the connection of RF transceiver 610 to RF transceiver 606 and to control a hands-free phone call via microphone 616, audio output 618, and portable electronic device 602.

Referring now to FIG. 6B, a detailed block diagram of vehicle control unit 630 is shown, according to an exemplary embodiment. Vehicle control unit 630 may be configured to serve as a communications gateway for the vehicle to which it is attached, configured to receive inputs from variety of systems or components and to provide one or more outputs to a user from the variety of systems or components.

Vehicle control unit 630 includes a data processing system 632. Data processing system 632 may be generally configured to control or facilitate functions of vehicle control unit 630. Data processing system 632 may be or include digital and/or analog processing components configured to provide data/signal processing features. Data processing system 632 may be or include a single data processing device (e.g., a processor) or multiple data processing devices (e.g., multiple processors, integrated circuits, etc.). Data processing system 632 may include any combination of program software (e.g., computer code, executable code, object code, etc.) stored in memory and electronics configured to execute the program software or to conduct other functions. Data processing system 632 may coordinate, control, and/or facilitate the various devices, components and features of vehicle control unit 630. According to one exemplary embodiment, data processing system 632 may include devices or modules such as a text-to-grammar module, a speech recognition module, and a text-to-speech module.

Vehicle control unit 630 further includes a display driver 634. Display driver 634 may be coupled to one or more electronic display such as output display 646 and to provide display information to the displays. Display driver 634 may be configured to control output display 646 with touch-screen capabilities, while in other exemplary embodiments, display driver 634 may be configured to control output display 646 without making use of touch-screen capabilities.

Memory device 638 of vehicle control unit 630 may be configured to store data accessible by data processing system 632 or any other component of vehicle control unit 630. Memory device 638 may store data/information from any of the connected devices or systems capable of communicating information to control unit 630. For example, memory device 638 may store data from portable electronic device 602, remote server 660, vehicle data bus 648 (or any electronics connected thereto), data received by training circuit 652, data received from audio input device 640, data received from user interface 642, etc. Data may be stored in memory device 638 for long term use, intermediate user in a current calculation or process, or for any other purpose. Memory device 638 may be or include one or both of volatile memory and non-volatile memory. According to an exemplary embodiment memory device 638 may store one or more user profiles, display profiles, communication profiles, navigation profiles, or any other type of user or system setting file. Memory device 638 may further be configured to store computer code, object code, script code, or other code executable by data processing system 632 or other electronics of control unit 630. According to an exemplary embodiment, when data processing system 632 executes computer code that it stores or is stored in memory device 638, data processing system 632 becomes a particular machine or circuit configured to provide or facilitate various of the tasks described herein.

Vehicle control unit 630 is shown coupled to an audio input device 640, a user interface 642, an audio output device 644, and audio system 650. User interface 642 is typically configured to facilitate tactile user interaction with vehicle control system 600. In various exemplary embodiments, user interface 642 may include pushbuttons, rotatable knobs or other tactile user contact points. Audio input device 640, for example a microphone, may be configured to receive audio generated by a user for transmission to data processing system 632 for speech recognition or for transmission to another system (e.g., portable electronic device 654) or for any other purpose. Audio output device 644, for example a built-in speaker, is configured to provide the user with an audio prompt of various functions, such as user selection confirmation. Audio system 650 can provide a number of input/output tasks. According to an exemplary embodiment, audio system 650 is the primary audio system of the vehicle (e.g., signals sent to audio system 650 are played back on one or more permanently installed speakers in the vehicle).

Output display 646 may be configured to display data related to the control of the vehicle functions, communications features, entertainment features, or the like. In still other exemplary embodiments, output display 646 may be of any technology (e.g., LCD, DLP, plasma, CRT), configuration (e.g., portrait or landscape), or shape (e.g., polygonal, curved, curvilinear). Output display 646 may be a manufacturer installed output display, an aftermarket output display, or an output display from any source. Output display 646 may be an embedded display (e.g., a display embedded in the control system or other vehicle systems, parts, or structures), a standalone display (e.g., a portable display, a display mounted on a movable arm), or a display having any other configuration.

Vehicle control unit 630 is additionally coupled to training circuit 652 (e.g., via a digital wire connection, via an analog wire connection, via a wireless connection, etc.) configured to communicate with a training circuit of a portable device (e.g., training circuit 604 of portable electronic device 602). The communications between training circuit 652 and training circuit 604 can be used by training circuit 652 and/or data processing system 632 to pair transceiver 610 and 606 for regular RF communications. Once paired, transceiver 606 of device 602 may conduct any number of data communications tasks. For example, transceiver 610 might pass audio data to transceiver 656. In embodiments where portable electronic device 602 includes mobile phone capability, portable electronic device 602 can communicate the audio data to remote server 660 (e.g., a mobile phone provider, an internet server, etc.). It should be appreciated that any type of data can be passed between transceiver 610 and 606 and/or to remote server 660 (e.g., audio data, meta data, voice data, display data, etc.).

Referring now to FIG. 6C, a process 670 for pairing portable electronic device 602 and a vehicle control system 600 (e.g., via vehicle control unit 630) is shown, according to an exemplary embodiment. Process 670 is shown to include bringing portable electronic device 602 near training circuit 614 of vehicle control system 600 (e.g., bringing portable electronic device 602 within a few centimeters of training circuit 614 of vehicle control system 600)(step 672). When portable electronic device 602 is near training circuit 614 of vehicle control system 600, information is exchanged between portable electronic device 602 and vehicle control system 600 (step 674). This information exchange may include exchanging authentication information (e.g., a passkey), identification information (e.g., unique identifiers of vehicle control system 600 and/or portable electronic device 602), command, request, or response information (e.g., a request from portable electronic device 602 to initiate a pairing activity, a response from vehicle control system 600 having an identifier and/or a passkey, etc.). Portable electronic device 602 and vehicle control system 600 may then be paired (step 676) via transceivers different than those used during the exchange of information of step 674. The pairing information may be stored in both or either of portable electronic device 602 and vehicle control system 600 for future pairings (step 678). The information stored may be the information exchanged in step 674, information exchanged during pairing step 676, or otherwise.

It should be noted that control unit 630 and/or its varying detailed components or modules can be integrated with and/or connected to any of the embodiments described herein. For example, data processing system 632 may be configured to facilitate and/or control the remote device activation activity of FIGS. 1-5B.

Figure 7A:
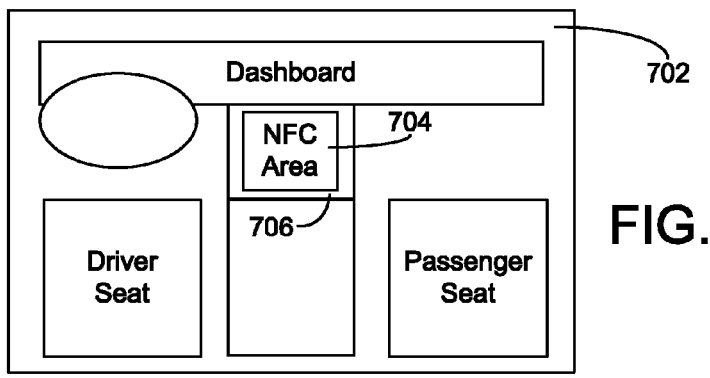
FIG. 7A is a schematic diagram of a vehicle interior, according to an exemplary embodiment.

Induction Field Communication for Controlling Use of Portable Electronic Devices in a Vehicle Referring now to FIG. 7A, a schematic diagram of a vehicle interior 702 is shown, according to an exemplary embodiment. Vehicle interior 702 is shown to include a near field communication (NFC) area 704 at a floor console location 706 between the driver seat and the passenger seat and position forward near the dashboard or center stack area. NFC area 704 may include a training circuit (or at least an antenna for a training circuit) as previously described. According to various exemplary embodiments, the antenna of NFC area 704 is configured to be mounted in the vehicle at a center stack location, a dashboard location, a center console location, an overhead console, a floor console location, an instrument panel location, a door panel location, a visor location, a rear-view mirror, a headliner location, or any other vehicle location. Area 704 may be a bin or container that opens and closes to totally surround the portable device or the bin may be permanently open on one or more sides.

Government laws have been enacted to restrict use of handsets in vehicles. One method to assist adherence to these rules would be to install systems/components within the vehicle that interfere with and/or otherwise degrade the performance of certain handset functions to an extent that effectively renders them unstable. Some vehicles make handset use and communications difficult from within the interior of the vehicle. This may be due to degradation of the wireless signals to and from the handset resulting from vehicle structural materials and/or materials embedded in the vehicle glass that interfere with and/or otherwise negatively impact the signal characteristics. One or more areas (e.g., pads, bins, containers, interior panels, etc.) where a portable electronic device may be placed within the vehicle could be designed with equipment to enhance the wireless performance the portable electronic device. For example, these areas could be configured to restrict wireless signals that could contribute to signal degradation from reaching the portable electronic device (e.g., the bin could be shielded).

Figure 7B:
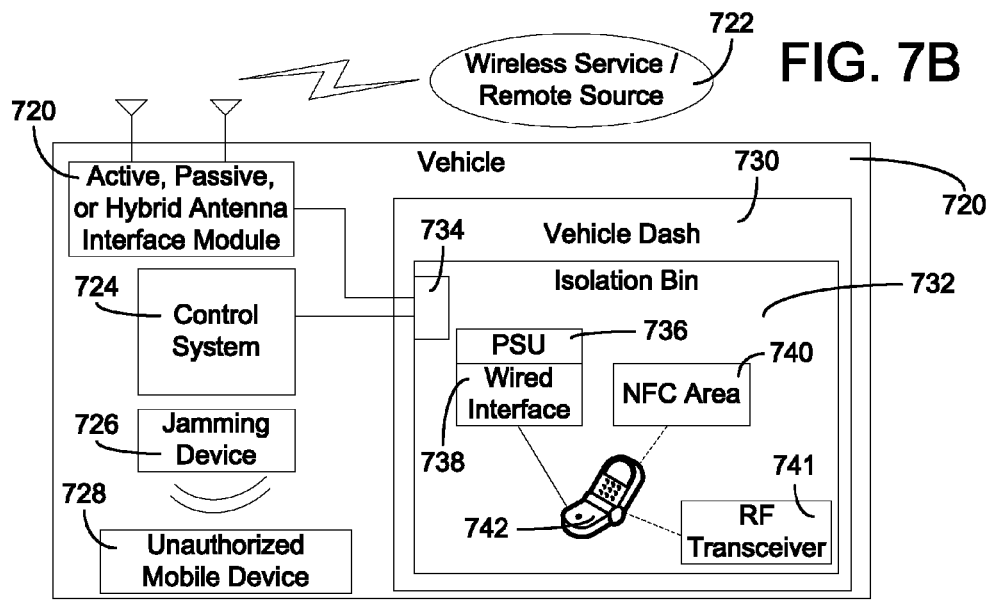
FIG. 7B is a block diagram of a vehicle control system, according to an exemplary embodiment.

Referring now to FIG. 7B, NFC area 740 is part of an isolation bin 732 installed in vehicle dash 730 of vehicle 720, according to an exemplary embodiment. NFC area 740 is shown as located near and/or adjacent a power supply unit 736 and a wired interface 738, which may also be part of an isolation bin 732. Isolation bin 732 may further include an interface 734 for coupling to an active, passive, or hybrid antenna module mounted to the vehicle (e.g., near an exterior surface of the vehicle, on an exterior surface of the vehicle, exterior the vehicle, etc.). Bin 732 may be coupled to control system 724 and portable device 742 may communicate with the control system via a communicative coupling (e.g., via wired interface 738, via NFC area 740, via RF transceiver 741) between electronics of bin 732 and control system 724. A vehicle 720 having bin 732 may also include a jamming device 726 configured to jam the signal of one or more unauthorized mobile devices 728. Antenna module 721 may facilitate improved communications between portable electronic device 742 and a wireless service/remote source 722.

Referring still to FIG. 7B, when a user enters vehicle 720 he or she could place his or her portable electronic device 742 in isolation bin 732. NFC area 740 can be used to exchange pairing information between portable electronic device 742 and control system 724. Using the pairing information, RF transceiver 741 (e.g., a Bluetooth transceiver) can form a wireless communication link with portable electronic device 742. Control system 724 can use the wireless communication link for hands-free communication activities involving portable electronic device 742. The user may also plug the portable electronic device 742 into wired interface 738 (which may be a docking station, a cord, or otherwise) to receive charging power from PSU 736 and/or to send and/or receive information to/from portable electronic device 742. According to an exemplary embodiment, isolation bin 732 is shielded so that external electromagnetic interference does not negatively affect the operation of portable electronic device 742. Isolation bin 732 may further include interface 734 which may include an antenna and transmitting/receiving elements for facilitating communications between portable electronic device 742 and the outside work (e.g., despite the shielding of isolation bin 732). Communication received at interface 734 from portable electronic device 742 can be transmitted (e.g., boosted, broadcast, repeated, etc.) via antenna interface module 721 having antennas near or at a vehicle exterior location. Communication received at antenna interface module 721 can be transmitted to portable electronic device 742 via interface 734.

Referring further to vehicle 720, jamming device 726 may be provided to vehicle 720 to disable the use of unauthorized mobile device 728. Control system 724 may be configured to enable jamming device 726 at highway speeds, on an ongoing basis, or based on other control logic. Accordingly, if a driver would like to utilize a portable electronic device for a phone conversation, to browse the internet, to send/receive text messages, or for any other purpose, the driver would need to place the portable electronic device in isolation bin 732 and use the hands-free features provided by RF transceiver 741 and control system 724.

In embodiments without jamming device 726, isolation bin 732 may not be shielded and NFC area 740 and RF transceiver 741 can be used to control communications within vehicle 720. For example, portable electronic devices 742 and 728 could include mandatory software that is configured to disable operation of the mobile phone when sent an "unauthorized use" signal from a vehicle control system/RF transceiver. Because of the requirement that portable electronic device be brought within centimeters of NFC area 740, NFC area 740 may be used to confirm that a user is not holding the portable electronic device up to his or her ear or otherwise manually manipulating portable electronic device 742 while driving. Portable electronic devices not placed within bin 732 and detectable by NFC area 740 while the car is moving may receive the "unauthorized use" signal and be disabled for certain functions (e.g., all but emergency calls, 911 calls, etc.). Software on the portable electronic devices for receiving the "unauthorized use" signal may be configured to respond to incoming text messages or calls with stock responses such as—"the cell phone you called is in a moving vehicle, please leave a message or try again later."

Figure 7C:
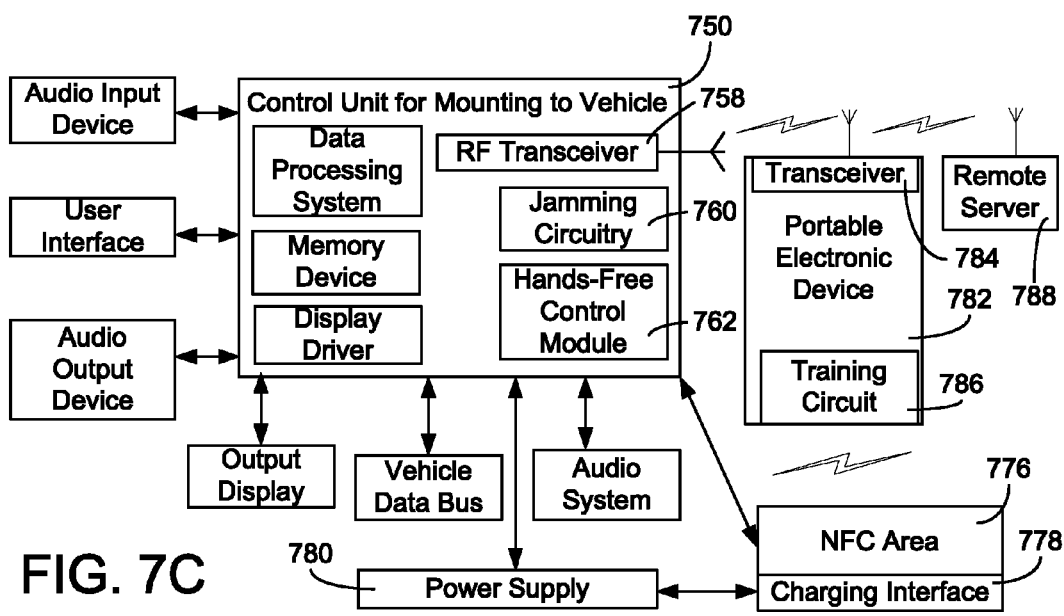
FIG. 7C is a block diagram of a control unit for mounting to a vehicle, according to another exemplary embodiment.

Referring now FIG. 7C, a control unit 750 for mounting to a vehicle is shown, according to an exemplary embodiment. Control unit 750 is shown to include a connection to NFC area 776 and power supply 780 is shown as coupled to charging area 778. Jamming circuitry 760 may be included with control unit 750. When training circuit 786 is near NFC area 776, jamming circuitry 760 may be configured to be disabled and RF transceiver 758 will pair with transceiver 784 so that portable electronic device 782 may receive communication from remote server 788. Hands-free control module 762 can utilize NFC area 776 to ensure that portable electronic device 782 is kept near NFC area 776 or in a bin (e.g., bin 732 shown in FIG. 7B). For example, if portable electronic device 782 is removed from a bin having NFC area 776, hands-free control module 762 can cause portable electronic device 782 to terminate its connection to remote server 788 (e.g., terminate its mobile phone connection) via a command sent from RF transceiver 758.

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for providing a control signal from a trainable transceiver to a remote device based on information stored in a portable electronic device, the system comprising:
   (A) the trainable transceiver mounted in a vehicle and comprising:
      a radio frequency transmitter for transmitting the control signal to the remote device;
      a first circuit configured to automatically receive first information from the portable electronic device via inductive-coupling between the portable electronic device and the first circuit when the portable electronic device is brought within the induction field of the first circuit, wherein the first information comprises a manufacturer identifier and a crypt key, wherein the received first information is stored in a memory; and
      a second circuit configured to use the first information received from the portable electronic device to cause the radio frequency transmitter to format the control signal in using at least the first information,
   (B) the portable electronic device comprising:
      a third circuit configured to automatically receive the first information from the remote device via inductive-coupling between the remote device and the third circuit when the portable electronic device is brought within an induction field of the remote device, and
   (C) the remote device comprising:
      a fourth circuit configured to automatically transmit the first information to the portable electronic device via inductive-coupling between the third circuit and the fourth circuit when the portable electronic device is brought within the induction field of the remote device, wherein the induction field of the remote device is generated by the fourth circuit.

2. The system of claim 1, wherein at least one of the first circuit, the third circuit, or the fourth circuit comprises a near-field communication (NFC) device.

3. The system of claim 2, wherein the remote device is a receiver coupled to a garage door opener and wherein the portable electronic device is a transmitter configured for communications with the garage door opener.

4. The system of claim 3, wherein the first circuit is configured to send second information to the portable electronic device, the second information configured to request the first information from the portable electronic device.

5. The system of claim 4, wherein the first circuit comprises a loop antenna configured to be located behind a structure of the vehicle relative to a passenger location in the vehicle.

6. The system of claim 5, wherein the loop antenna is configured to be mounted in at least one of a center stack location, a dashboard location, a center console location, an overhead console, a floor console location, an instrument panel location, a door panel location, a visor location, a rearview mirror, and a headliner location of the vehicle.

7. A method for providing a control signal from a RF transmitter coupled to a vehicle to a remote device based on information stored in a portable electronic device, the method comprising:
   automatically receiving first information at the portable electronic device from the remote device via inductive-coupling between the portable electronic device and a first circuit of the remote device, the first information automatically received when the portable electronic device is brought within an induction field of the first circuit, storing the received first information in a memory of the portable electronic device,
automatically receiving the first information at the RF transmitter from the portable electronic device via inductive-coupling between the portable electronic device and a second circuit included in the RF transmitter coupled to the vehicle, the first information automatically received when the portable electronic device is brought within an induction field of the second circuit, wherein the first information received by the second circuit comprises a manufacturer identifier, a crypt key, and a modulation scheme identifier;
storing the received first information in a memory of the RF transmitter;
using a third circuit included in the RF transmitter to process the first information received from the portable electronic device to cause the RF transmitter to format the control signal using at least the first information; and
transmitting the control signal to the remote device via the RF transmitter.

8. The method of claim 7, wherein at least one of the first circuit or the second circuit comprises a near-field communication (NFC) device.

9. The method of claim 8, further comprising:
sending second information to the portable electronic device using the first second circuit, the second information configured to request the first information from the portable electronic device.

10. The method of claim 9, wherein the second circuit comprises a loop antenna, and wherein the loop antenna is configured to be located behind a structure of the vehicle relative to a passenger location in the vehicle, wherein the loop antenna is configured to be mounted in at least one of a center stack location, a dashboard location, a center console location, an overhead console, a floor console location, an instrument panel location, a door panel location, a visor location, a rear-view mirror, and a headliner location of the vehicle.

* * * * *